Nov. 9, 1948.   P. DUNSHEATH ET AL   2,453,420
BUOYANT ELECTRIC CABLE
Original Filed Nov. 30, 1940
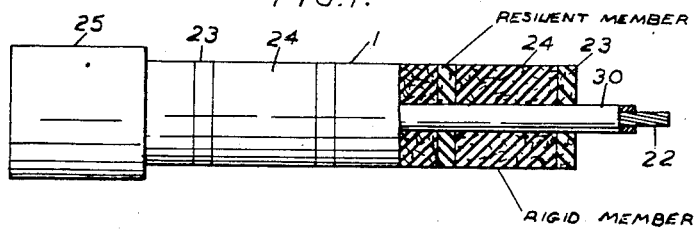
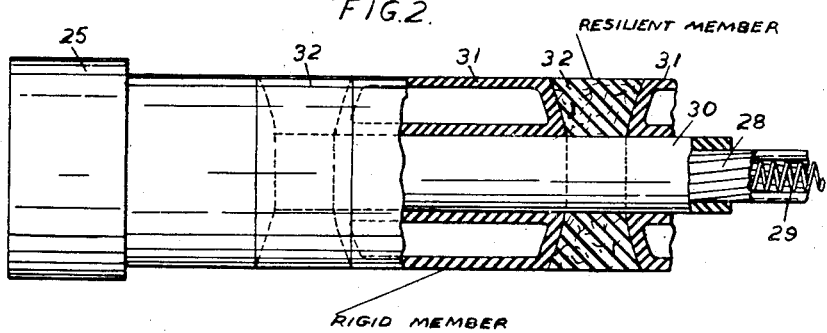
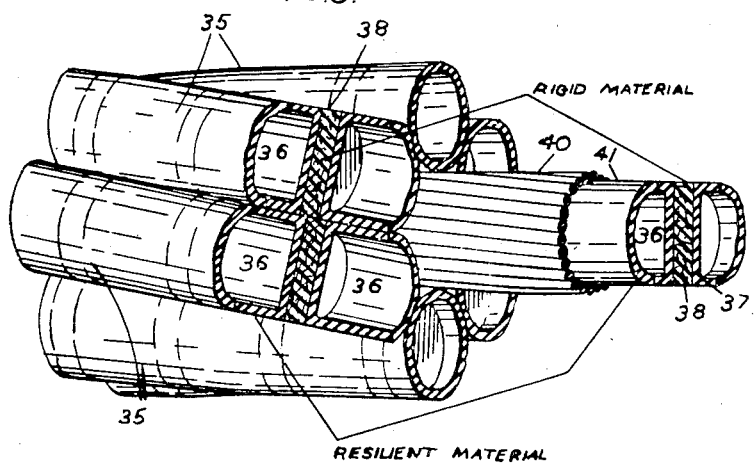

Patented Nov. 9, 1948

2,453,420

UNITED STATES PATENT OFFICE 2,453,420

BUOYANT ELECTRIC CABLE

Percy Dunsheath, Abinger, and William Cyril Barry, Gravesend, England, assignors to W. T. Henley's Telegraph Works Company Limited, London, England, a British company Original application November 30, 1940, Serial No. 367,924. Divided and this application November 30, 1946, Serial No. 713,320. In Great Britain January 4, 1940

18 Claims. (Cl. 174—101.5)

This invention is concerned with the production of insulated electric power cable which is capable of floating in water and of transmitting power currents. For many purposes such cable must be flexible as well as buoyant and must possess sufficient tensile strength to enable it to be trailed in considerable lengths without excessive deformation. It should offer as little friction as practicable and it should be capable of giving up easily to the medium in which it floats heat generated in the cable by the passage of current therethrough. In the specification of our co-pending application Serial No. 367,924 filed on November 30, 1940, and of which this application is a division there is described and claimed a cable which satisfies the aforesaid rather onerous requirements and comprises a buoyancy element in the form of an elongated cellular member built up of a series of resilient members with relatively rigid members intercalated in the series of resilient members. In the specific forms of construction claimed in the said application the resilient members are inflated hollow bodies. In the specification of our co-pending application Serial No. 713,319, filed on November 30, 1946. which is also a division from application Serial No. 367,924, there is described and claimed a specific form of construction of buoyant cable comprising an elongated cellular core built up of a series of members of resilient cellular material and a plurality of members of relatively rigid material intercalated in the series of members of resilient cellular material. By the present invention we provide a form of construction of water-buoyant electric cable comprising a flexible core member and a buoyancy-imparting element disposed about said flexible core member and comprising a series of resilient members with relatively rigid members intercalated in said series of resilient members. The combination of resilient members with relatively rigid members results in a buoyant cable core which is sufficiently flexible yet possesses adequate resistance to radial compression. Either the resilient members or the rigid members or both resilient and rigid members may be of cellular form and the size of the closed hollow cells may vary very considerably according to the material or materials used for the manufacture of the buoyancy-imparting element.

The flexible core member may constitute the central conductor of the cable. The buoyancy element disposed about the flexible core member may comprise a series of inflated cylinders of flexible material, with intercalations of cylinders of relatively rigid material which may or may not be of cellular form, or it may comprise a series of cylinders of resilient cellular material, for instance, soft expanded rubber, with intercalations of cylinders of relatively rigid cellular material, for instance hard expanded rubber, cork or wood. The term "cylinder" is used herein in its broadest sense and where the context permits includes not only right circular bodies but bodies having a surface approximating to the cylindrical, cylindrical or approximately cylindrical surfaced bodies with concave or convex ends and such short cylindrical or approximately cylindrical bodies as might properly be termed discs. Alternatively, the buoyancy-imparting element may comprise a series of resilient members with intercalations of hollow metal drums or drums of moulded material, for instance, a phenolformaldehyde resin or hard rubber.

The buoyancy-imparting element may consist of a single chain of resilient and relatively rigid members of annular form which are threaded on the flexible core member. In cable such as dredger cable, where the current to be carried is relatively small, the flexible core member may be the cable conductor and the elements of the chain may, if they are of insulating material, serve as dielectric for the conductor. In some cases the buoyancy-imparting element may be built up of a number of chains of resilient and relatively rigid members disposed about a central conductor which may be a solid or hollow strand.

The invention will now be more fully described with the aid of the accompanying drawings which show, by way of example, three specific forms of cable constructed in accordance with the invention and comprising a flexible core member and a buoyancy-imparting element or elements disposed thereabout.

In the drawings

Figure 1 is an elevation, partly in section, of the stepped end of a buoyant cable having a central conductor located within one form of buoyancy element, Figure 2 is an elevation, partly in section, of the stepped end of a buoyant cable with a central conductor located within a second form of buoyancy element, Figure 3 shows the core of a buoyant power cable comprising a hollow conductor located within a group of elongated cavitied members.

In the form of construction shown in Figure 1, the cable has a central conductor 22 which is insulated by a covering 30 of rubber and supported by a buoyancy element of annular form. This buoyancy element comprises resilient members 23 alternating with relatively rigid members 24. The former are shown to be short annular cylinders or discs of soft expanded rubber and the latter cylinders of hard expanded rubber. They are all threaded on the insulated conductor. The conductor and the buoyancy-imparting element disposed thereabout are enclosed in a waterproof protective covering 25 of tough rubber or the like. It will be apparent that an alternative form of annular buoyancy element for this type of cable may be built up of inflated spheres or cylinders and of rigid cylinders of the type described with reference to Figures 1–3 inclusive of our co-pending application Serial No. 367,924, provided they are furnished with a central passage for the insulated conductor on which they are to be threaded.

Figure 2 shows a buoyant cable embodying a central hollow conductor built up in a known manner of a single layer of wires 28 stranded about a support 29 consisting of an open helix of a strip of suitable cross section, for instance, of channel, arcuate or circular cross-section, of metal or of hard non-metallic material such as hard rubber or synthetic plastic. The conductor is insulated by a covering 30 of suitable insulating material and on the insulated conductor are threaded alternatively hollow drums 31 of annular form and annular discs 32 of resilient material.

Figure 3 shows the core of a buoyant cable comprising a number of cavitied bodies 35 disposed about the central conductor. The latter may be a solid strand or, as shown, a hollow conductor 40 formed by stranding the component wires about a cavitied member 41. The members 35 and 41 each comprise a plurality of large cells 36 having resilient rubber walls 37 separated by hard rubber discs 38 which are vulcanised to the end walls of the cells. Such a member may be made by inserting in a tubular mould, first a disc of an unvulcanised or partially vulcanised hard rubber composition, then a hollow body of an unvulcanised soft rubber composition, containing a quantity of a substance which on heating decomposes with evolution of gas, then a disc of hard rubber composition, and so on. The composite body is then heated within the mould until vulcanisation is complete.

What we claim as our invention is:

1. In water-buoyant insulated electric cable, a flexible core member and a buoyancy element disposed about said core member and comprising a series of resilient members with relatively rigid members intercalated in said series of resilient members.

2. In water-buoyant insulated electric cable, a buoyancy element comprising at least one series of resilient members with relatively rigid members intercalated therein, and a conductor located within said buoyancy element.

3. In water-buoyant insulated electric cable, a buoyancy element comprising at least one series of resilient members with relatively rigid members intercalated therein and a stranded conductor located within said buoyancy element.

4. In water-buoyant insulated electric cable, a buoyancy element comprising at least one series of resilient members with relatively rigid members intercalated therein and a conductor located centrally within said buoyancy element.

5. In water-buoyant insulated electric cable, a buoyancy element comprising at least one series of resilient members with relatively rigid members intercalated therein and a hollow conductor located centrally within said buoyancy element and comprising a layer of wires extending helically about a longitudinally flexible support.

6. In water-buoyant insulated electric cable, a buoyancy element comprising a series of resilient members each having a longitudinally extending aperture therein and relatively rigid members intercalated in said series and having longitudinally extending apertures in register with the apertures in adjacent members, and a flexible electric conductor housed in said registering apertures.

7. In water-buoyant insulated electric power cable, a buoyancy element consisting of a series of resilient members with intercalations of relatively rigid members, all the said members being of annular form and threaded on a flexible core member.

8. In water-buoyant insulated electric power cable, an insulated conductor and a buoyancy element comprising cylinders of hard expanded rubber and cylinders of soft expanded rubber, each two adjacent cylinders of hard rubber being separated by a cylinder of soft rubber and all said cylinders being of annular form and threaded on said insulated conductor.

9. In water-buoyant insulated electric power cable, a buoyancy element comprising a series of cylinders of resilient cellular material and a plurality of hollow cylinders of relatively rigid material intercalated in said series and each having at least one tubular walled passage extending from end to end thereof in register with a longitudinally extending aperture in each of the adjacent members of the series, and a flexible conductor housed in said registering apertures and passages.

10. In water-buoyant insulated electric power cable, a flexible conductor and a buoyancy element comprising a series of closed cylindrical containers of annular cross-section and of rigid material threaded on said conductor and a plurality of cylinders of annular cross-section and of resilient material also threaded on said conductor, at least one of said cylinders being located between each two successive containers.

11. In water-buoyant insulated electric power cable, a flexible conductor and a buoyancy element comprising a series of closed cylindrical containers of rigid material and a plurality of cylinders of resilient material, said containers and said cylinders being of annular cross-section and threaded on said conductor, each two adjacent containers being separated by at least one of said cylinders and the ends of said containers and cylinders being correspondingly spherically curved whereby the end of one member forms a spherical seating for the end of the next.

12. In water-buoyant insulated electric power cable, a central conductor and a plurality of elongated cavitied members each built up of a series of resilient members with relatively rigid members intercalated in said series, collectively surrounding said conductor.

13. In water-buoyant insulated electric power cable, a central conductor and a plurality of elongated cavitied members laid up helically around said conductor and comprising each a series of resilient members with relatively rigid members intercalated in said series.

14. In water-buoyant insulated electric power cable, a central conductor and a plurality of elongated members collectively surrounding said conductor, each of at least some of said members consisting of inflated cells with flexible walls separated from one another by cylinders of relatively rigid material.

15. In water-buoyant insulated electric power cable, a central conductor and a plurality of elongated members collectively surrounding said conductor, each of at least some of which members consists of inflated cells with walls of soft rubber and of intervening cylinders of relatively rigid cellular material.

16. A water-buoyant insulated electric power cable comprising a central core comprising inflated cells with flexible walls separated by cylinders of relatively rigid material, a hollow conductor consisting of wires laid helically around said core, and a plurality of elongated members disposed helically about said conductor and each comprising inflated cells with flexible walls separated by cylinders of relatively rigid material.

17. A buoyancy element for water-buoyant insulated electric power cable comprising a cavitied member consisting of inflated cells with flexible rubber walls separated by cylinders of hard rubber vulcanised thereto.

18. In water-buoyant insulated electric power cable, a core comprising a central conductor and a plurality of cavitied members collectively surrounding said conductor and each consisting of inflated cells with flexible rubber walls separated by cylinders of hard rubber vulcanised thereto.

PERCY DUNSHEATH.
WILLIAM CYRIL BARRY.

REFERENCES CITED

The following references are of record in the file of this patent:

UNITED STATES PATENTS

| Number | Name | Date |
|---|---|---|
| 1,430,042 | Von Raczynski | Sept. 26, 1922 |
| 2,029,421 | Green et al. | Feb. 4, 1936 |
| 2,048,811 | Pierce | July 28, 1936 |